United States Patent
van Wouw

(10) Patent No.: US 7,047,713 B2
(45) Date of Patent: May 23, 2006

(54) LOW PROFILE GEARBOX HOUSING

(75) Inventor: Rob van Wouw, Cary, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/763,706

(22) Filed: Jan. 22, 2004

(65) Prior Publication Data
US 2005/0160712 A1    Jul. 28, 2005

(51) Int. Cl.
*A01D 69/00*    (2006.01)
(52) U.S. Cl. .................. 56/10.8; 56/DIG. 6; 70/606 R
(58) Field of Classification Search ............... 56/10.8, 56/11.1, 11.7, DIG. 6; 74/606 R
See application file for complete search history.

(56) References Cited

U.S. PATENT DOCUMENTS

| | | | | |
|---|---|---|---|---|
| 2,808,696 A | * | 10/1957 | Hall | 56/296 |
| 3,245,085 A | | 4/1966 | Lewis | 74/665 |
| 3,385,043 A | | 5/1968 | Seymore | 56/503 |
| 3,965,658 A | * | 6/1976 | van der Lely | 56/192 |
| 4,149,359 A | * | 4/1979 | van der Lely | 56/13.6 |
| 4,852,426 A | * | 8/1989 | DeRees | 74/607 |
| 4,936,885 A | * | 6/1990 | Samejima et al. | 56/13.3 |
| 5,392,670 A | * | 2/1995 | Hauser | 74/606 R |
| 5,450,714 A | * | 9/1995 | Lurwig | 56/13.5 |
| 5,465,561 A | * | 11/1995 | Samejima et al. | 56/11.8 |
| 5,481,857 A | * | 1/1996 | Umemoto et al. | 56/12.6 |
| 5,655,418 A | | 8/1997 | Barnholt | 74/607 |
| 5,778,645 A | * | 7/1998 | Irikura et al. | 56/11.8 |

FOREIGN PATENT DOCUMENTS

FR    2 357 161    2/1978

* cited by examiner

*Primary Examiner*—Meredith Petravick
*Assistant Examiner*—Alicia Torres

(57) ABSTRACT

A gear box for a grass mowing machine with a generally horizontal shaft extending from the engine and/or transmission, and a rotary cutting blade with a generally vertical shaft. The gear box has a top surface and a bottom surface, the gear box enclosing the first end of the generally horizontal shaft and the first end of the generally vertical shaft. The generally vertical shaft extends through the bottom surface of the gear box. The gear box houses a pair of spiral bevel gears to change the transmitting direction from the generally horizontal shaft to the generally vertical shaft. The measurement from the generally horizontal shaft to the bottom surface of the gear box is greater than the measurement from the generally horizontal shaft to the top surface of the gear box.

13 Claims, 4 Drawing Sheets

LOW PROFILE GEARBOX HOUSING

FIELD OF THE INVENTION

The present invention relates to gear boxes for grass and vegetation mowers, and more specifically to gear boxes that change the transmitting direction between an engine or transmission, and one or more rotating cutting blades.

BACKGROUND OF THE INVENTION

Grass and vegetation mowing equipment including lawn and garden tractors, zero-turn or spin-turn mowers, and various other mower configurations may have an internal combustion engine or other power supply with a generally horizontal crankshaft, a transmission, and one or more rotary cutting blades mounted to generally vertical shafts. A gear box may change the transmitting direction between the engine and cutting blades. Each cutting blade may be positioned under a mower deck, and the gear box may be located on or above the upper surface of the mower deck.

A gear box houses pairs of spiral bevel gears to change the transmitting direction from an input shaft to an output shaft. For example, spiral bevel gears and sections of shafts may be disposed at right angles to each other, to change the transmitting direction from a generally horizontal direction to a generally vertical direction.

A mower operator may be seated or standing on a platform that is on or above the upper surface of the mower deck. The platform may be directly or generally over the gear box. The height of the platform and seat over the deck may result in a high center of gravity for the vehicle and operator, which may present an instability problem. Additionally, the platform may be at such a height above the ground surface so that some operators may find it awkward to step up onto the platform.

A mowing device is needed with improved stability. A grass mower is needed with an operator platform and seat at a lower height, with a lower center of gravity. A gear box is needed that will help improve the stability of such a vehicle, and lower the center of gravity, operator platform, and seat.

SUMMARY OF THE INVENTION

A gear box transmits power from an engine or transmission with a horizontal shaft, to a cutting blade with a vertical shaft. An input shaft from the engine or transmission is inserted through a first opening in the gear box housing, and an output shaft to the cutting blade is inserted through a second opening in the housing. A first spiral bevel gear is attached to the input shaft and a second spiral bevel gear is attached to the output shaft and is engageable with the first spiral bevel gear. The input shaft has an axis, and the housing is asymmetrical with respect to the axis. For example, the measurement from the input shaft axis to the outer surface of the housing adjacent the second opening may be greater than the measurement from the input shaft axis to the outer surface of the cover.

DESCRIPTION OF THE PREFERRED EMBODIMENT

Figure 1:
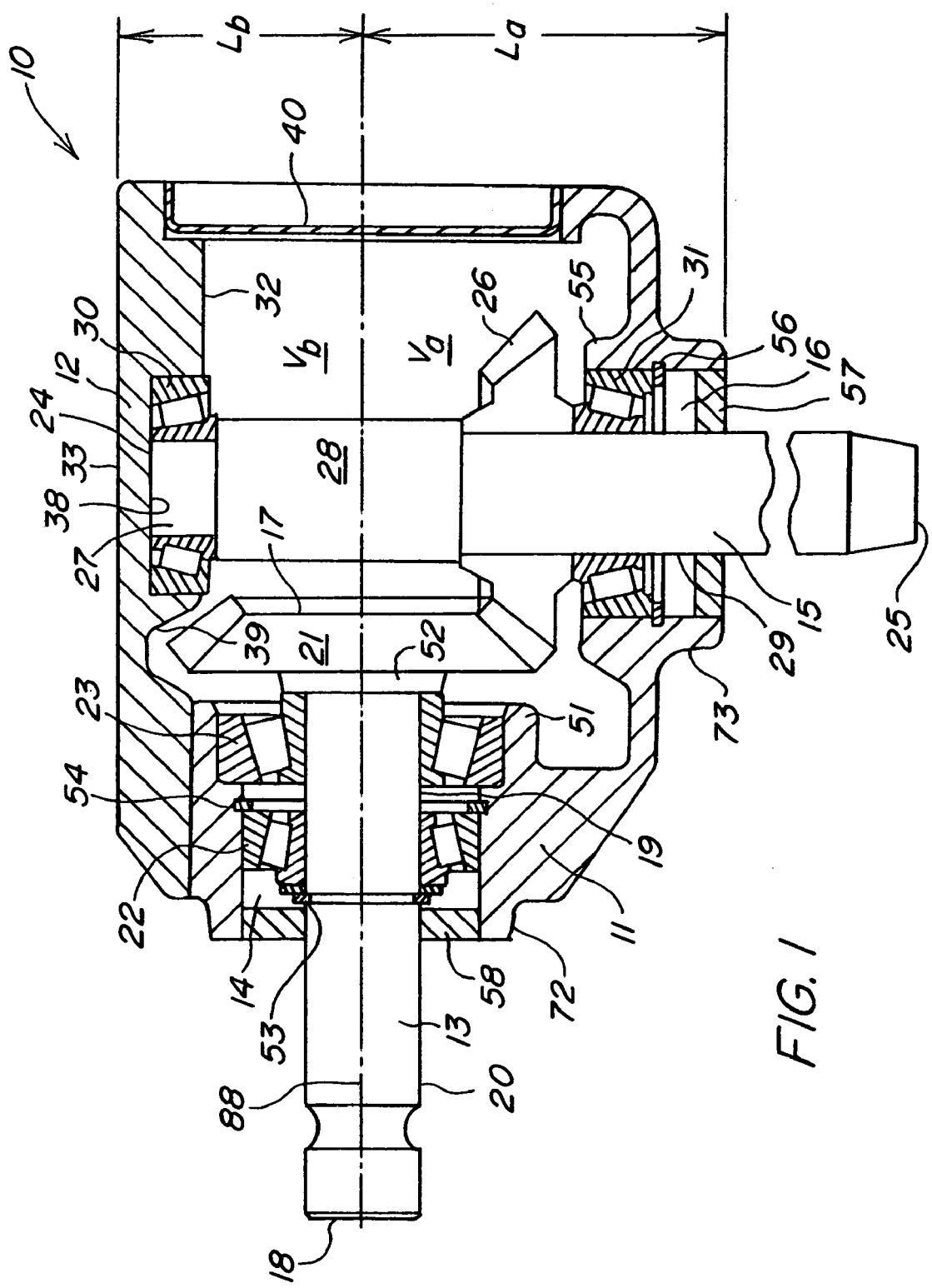
FIG. 1 is a cross section view of a gear box according to one embodiment of the invention.
Figure 2:
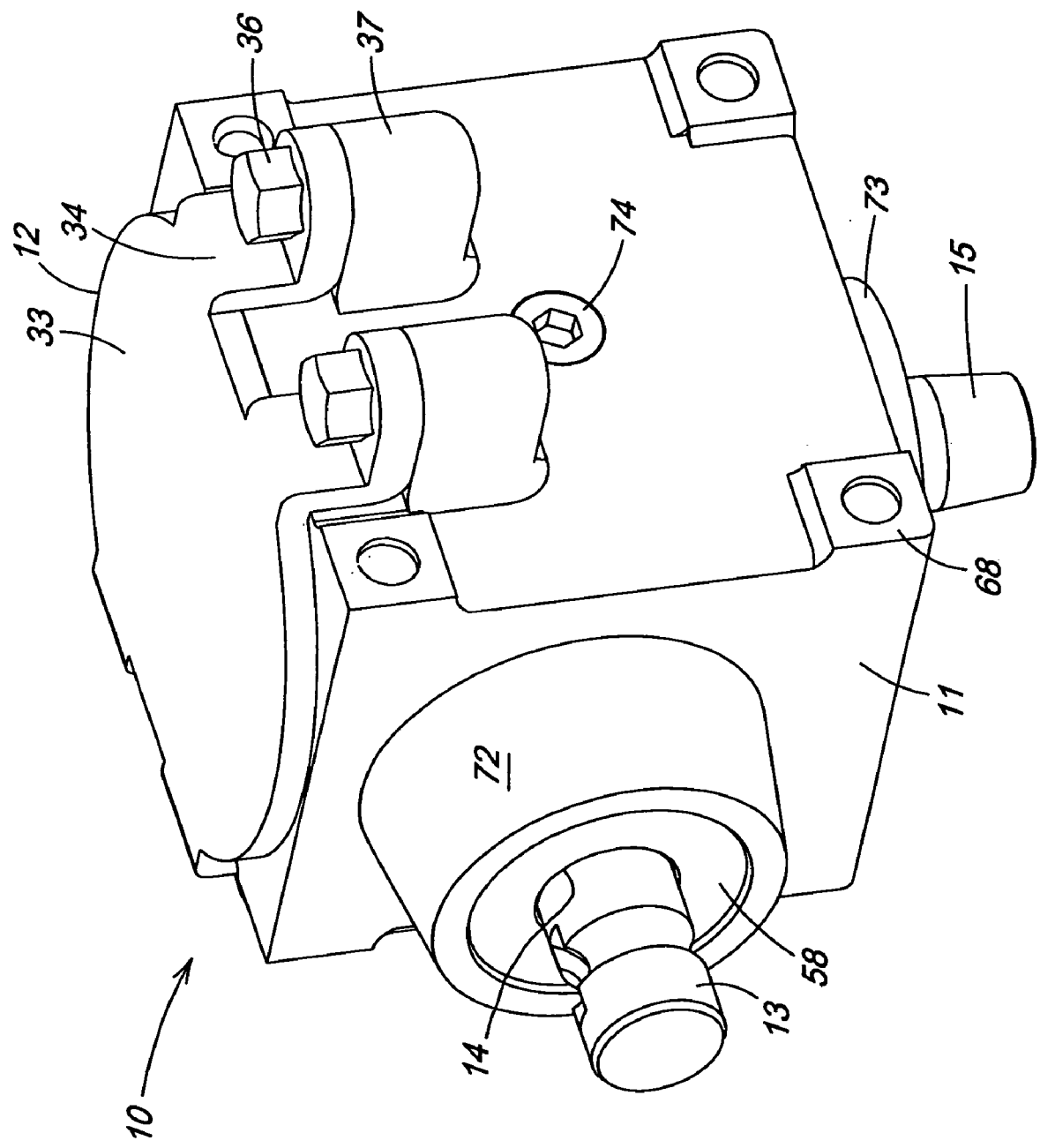
FIG. 2 is a perspective view of a gear box according to one embodiment of the invention.

Referring to FIGS. 1 and 2, in a first embodiment gear box 10 includes housing 11 and removable cover 12, with input shaft 13 inserted through first opening 14 in a side of the housing and output shaft 15 inserted through second opening 16 in the bottom of the housing. The housing may have a top that is at least partially open, four sides, and a bottom. The removable cover may be attached to the at least partially open top.

The input shaft has axis 88. The output shaft may be perpendicular to the input shaft. The gear box housing may be a metal casting that may be asymmetrical with respect to axis 88, as will be described in more detail below.

Figure 3:
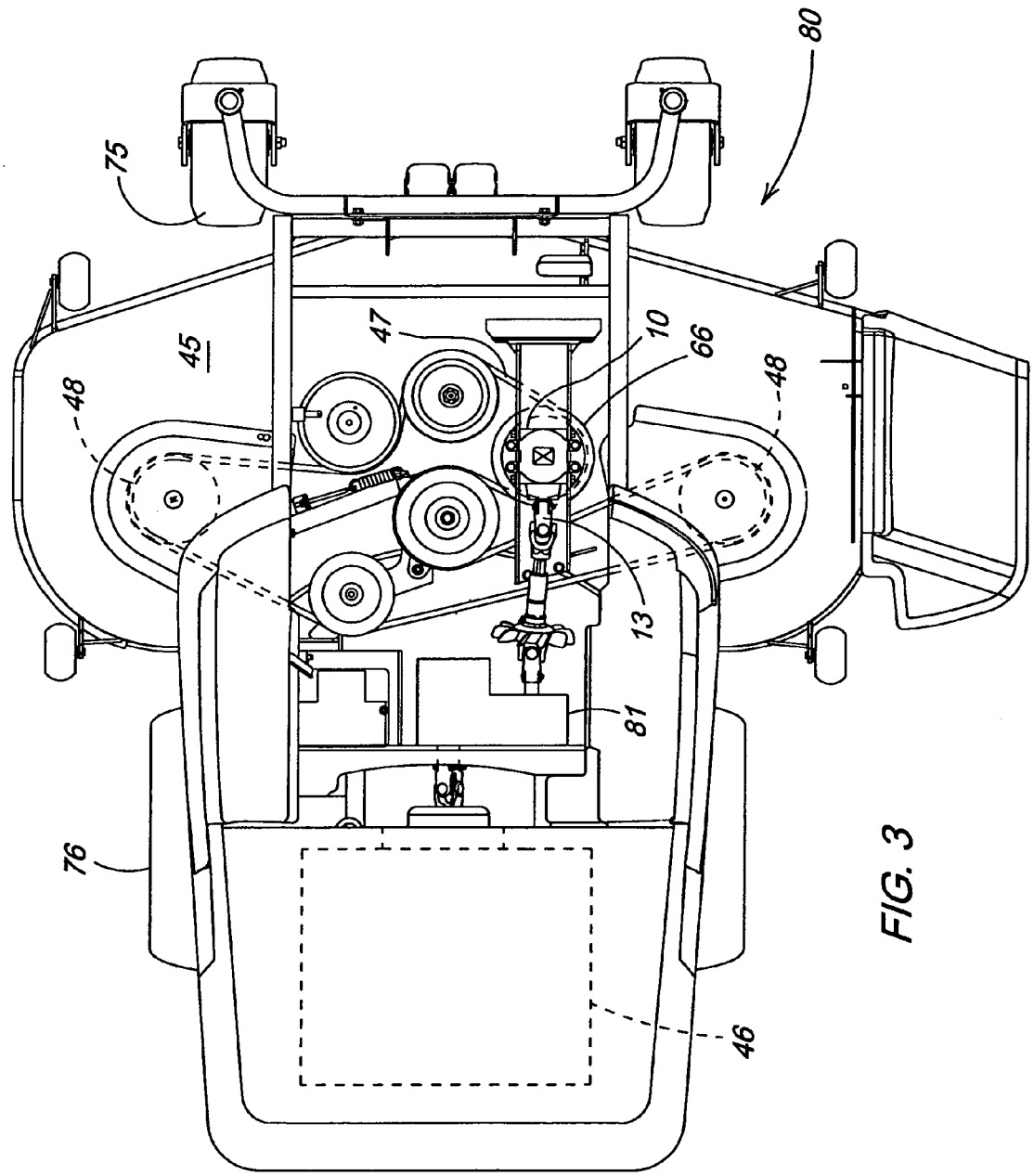
FIG. 3 is a top view of a grass mowing machine with a gear box according to a first embodiment.

As shown in FIG. 3, input shaft 13 may be operably connected to internal combustion engine 46 through transmission 81, or to another power supply and/or transmission. The input shaft may have a generally horizontal orientation, and one or more joints may be included between engine 46, transmission 81 and gear box 10.

Referring again to FIG. 1, the input shaft may be generally cylindrical in cross section with first end 17 and second end 18. First section 19 of the input shaft may be positioned in the gear box housing, and second section 20 may be outside the housing. First spiral bevel gear 21 may be attached to the first end of the input shaft. Boss 52 may be formed on the input shaft adjacent the first spiral bevel gear.

Roller bearings 22 and 23 may be positioned in the first opening around the outer circumference of the first portion of the input shaft. Each roller bearing 22, 23 may have a generally tapered cone or cup shape. In one embodiment, inwardly extending collar 51 may receive and position roller bearing 23. Locking rings 53 and 54 may restrict axial motion of the input shaft and/or one or both of the roller bearings. Annular cap 58 may be positioned in the first opening in outwardly extending collar 72 around the input shaft.

The output shaft also may be generally cylindrical in cross section, have a generally vertical orientation, and first end 24 and second end 25. The second end of the output shaft may face downwardly when the gear box is in a mower. The first end may be in the housing at a position adjacent the inner surface of cover 12. The output shaft may be operably connected to a pulley and or at least one rotary cutting blade. For example, a rotary cutting blade may be directly mounted to second end 25. Alternatively, one or more pulleys may be mounted to the output shaft at or adjacent the second end thereof, and one or more belts may be wound around the pulley(s) to drive one or more cutting blades mounted to vertical shafts extending below the mower deck.

Second spiral bevel gear 26 may be attached to the output shaft in the housing. The second spiral bevel gear may have teeth to mesh with the teeth of the first or input spiral bevel gear. The second spiral bevel gear may have a different diameter and number of teeth than the first spiral bevel gear, so as to provide a desired speed ratio between the input and output shafts.

In one embodiment, the output shaft may have one or more variations or steps in its outer diameter and circumference. For example, from the first end, the output shaft may have first section 27 with a first diameter, second section 28 with a second diameter, and third section 29 with a third diameter. Optionally, the third section may have a diameter that is at least partially tapered. The first and second sections of the output shaft may be enclosed in the housing. The third section may be at least partially in the housing and extend at least partially outside the housing. In one embodiment, the diameter of the first section of the output shaft may be about 25 mm, the diameter of the second section may be about 32 mm, and the diameter of the third section may be about 25 mm.

Roller bearing 30 may be positioned in the housing at or adjacent removable cover 12 and around the outer circumference of the first section of the output shaft. Roller bearing 31 may be positioned in second opening 16 around the outer circumference of third section 29 of the output shaft. The second opening of the housing may have outwardly facing collar 73. Locking ring 56 may be captured in a groove in the second opening to restrict motion of roller bearing 31. Annular cap 57 may be positioned in the second opening around the output shaft.

In one embodiment, removable cover 12 may have an inner surface 32 and an outer or top surface 33. The top surface of the cover may face upwardly when the gear box is in a mower. Cover 12 may also have one or more peripheral flange portions 34, with one or more holes extending therethrough. Threaded fasteners such as cap screws 36 may be inserted through each hole. The outer periphery of the gear box housing may have internally threaded openings 37 into which the threaded fasteners may be inserted.

In one embodiment, the inner surface of the cover may have inwardly extending collar 38 for receiving and positioning roller bearing 30. The inner surface of the cover also may have an internal recess 39 dimensioned to provide adequate clearance space for input bevel gear 21. Collar 55 also may extend inwardly from the housing to receive and position roller bearing 31.

The gear box housing may have one or more cup-shaped plugs 40 that seal openings in the housing. The gear box internal volume may contain or be at least partially filled with lubricating oil, which may be accessed through plug 74. The housing also may include one or more internally threaded fasteners 68 that may be used to secure the gear box to a mower.

As mentioned above, the gear box housing may be asymmetrical with respect to axis 88 of the input shaft, and this may be observed or determined by one or more measurements. For example, it may be measured as a difference between the internal volume of the gear box housing on each side of axis 88. In the orientation of FIG. 1 in which the input shaft has a generally horizontal orientation, the internal volume of the housing below the horizontal axis of the input shaft is shown as $V_a$. The internal volume of the housing above the horizontal axis of the input shaft is shown as $V_b$. In the embodiment shown, $V_a$ is greater than $V_b$.

Alternatively, asymmetry of the gear box housing may be seen as a difference in length between measurements from the axis of the input shaft to the outer top and bottom of the housing (with the removable cover attached). In the orientation of FIG. 1, the measurement from the axis of the input shaft to the bottom of the housing (adjacent the second opening) is shown as $L_a$. The measurement from the axis or center line of the input shaft to the top of the removable cover is shown as $L_b$. In one embodiment, $L_a$ is longer than $L_b$, and most preferably $L_a$ is at least about twice the length of $L_b$. For example, in the embodiment of FIG. 1, $L_a$ is about 75 mm and $L_b$ is about 35 mm.

Figure 4:
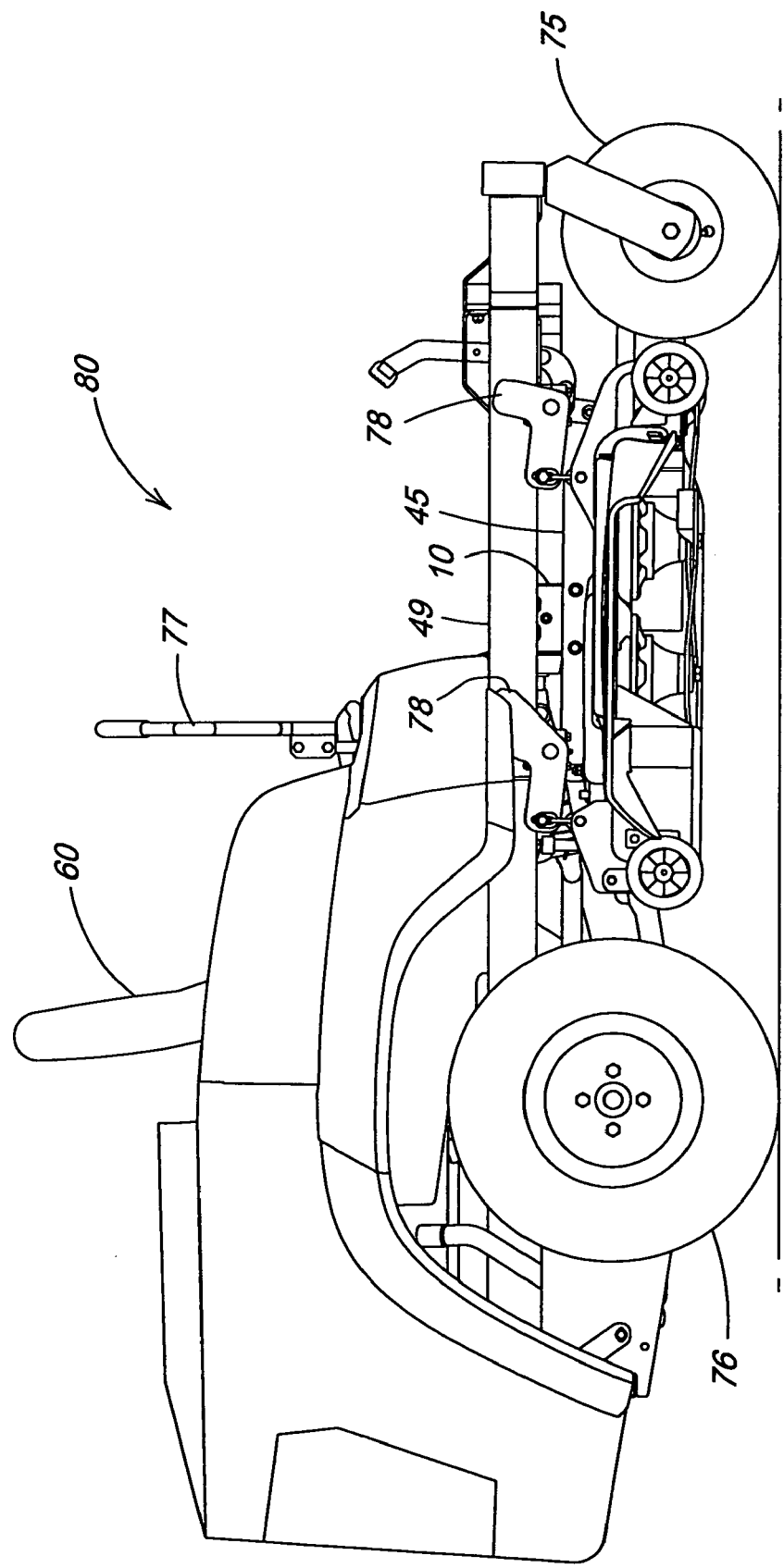
FIG. 4 is a side view of a grass mowing machine with a gear box according to a first embodiment.

Now referring to FIG. 4, gear box 10 is shown mounted on or over mower deck 45 of grass mowing machine 80. The mower deck may be raised or lowered with hangers 78 which may be attached to platform 49. The mower deck in FIG. 4 is shown in a raised position. The mower deck is positioned longitudinally between front wheels 75 and rear wheels 76 of the mower. The gear box is positioned between the mower deck and platform 49. Operator seat 60 and control devices 77 are positioned on or above the operator platform, at least partially over the mower deck.

Referring back to FIG. 3, pulley 66 may be driven by the output shaft of gear box 10. Belt 47 may be wound around pulley 66 to drive other vertical shafts with cutting blades under mower deck 45, through pulleys 48.

Having described the preferred embodiment, it will become apparent that various modifications can be made without departing from the scope of the invention as defined in the accompanying claims.

The invention claimed is:

1. An apparatus comprising:
a gear box mounted to a mower deck of a riding mower, the gear box positioned between the mower deck and an operator platform and having a one-piece low-profile housing with a bottom having an opening with a first collar, four sides, and an at least partially open top, a cover over the at least partially open top having an internal recess and a second collar, an input shaft having a terminal end inserted through an opening in one of the sides, an output shaft perpendicular to the input shaft inserted through the opening in the bottom and having an end adjacent the top, a first roller bearing positioned in the first collar around the output shaft, a second roller bearing positioned in the second collar around the end of the output shaft, a first spiral bevel gear attached to the terminal end of the input shaft adjacent the opening through which the terminal end is inserted, the internal recess dimensioned to provide adequate clearance for the first spiral bevel gear and receiving the first bevel gear, and a second spiral bevel gear attached to the output shaft and being engageable with the first spiral bevel gear, the input shaft having an axis, the measurement from the axis of the input shaft to the bottom of the housing being greater than the measurement from the axis of the input shaft to the cover.

2. The apparatus of claim 1 wherein the input shaft has a generally horizontal axis and the output shaft has a generally vertical axis.

3. The apparatus of claim 1 further comprising threaded fasteners connecting the cover to the housing.

4. The apparatus of claim 1 further comprising a rotary cutting blade mounted to the output shaft.

5. The apparatus of claim 1 further comprising a pulley mounted to the output shaft, and a belt wound around the pulley turning a plurality of rotary cutting blades mounted on vertical shafts.

6. The apparatus of claim 1 wherein the input shaft is connected to a transmission.

7. An apparatus comprising:
a riding mower having an engine, a mower deck under which at least one rotary cutting blade is positioned to rotate, and a platform having an operator seat over the mower deck;
an input shaft having a generally horizontal axis operably connected to the engine, and an output shaft having a generally vertical axis having a first end and a second end, the second end connected to the at least one rotary cutting blade; and a gear box having a housing positioned between the mower deck and the platform, the housing having an internal volume containing a first spiral bevel gear mounted to the input shaft and a second spiral bevel gear mounted to the output shaft and meshed with the first spiral bevel gear; the housing having a bottom with an opening and a collar receiving and positioning a first roller bearing to rotatably support the output shaft between the first and second ends; the housing having a removable cover with a collar receiving and positioning a second roller bearing to rotatably support the first end of the output shaft and an internal recess dimensioned to provide adequate clearance space for the first spiral bevel gear and receiving the first bevel gear; the internal volume below the generally horizontal axis of the input shaft being greater than the internal volume above the generally horizontal axis of the input shaft.

8. An apparatus comprising:

a riding mower having an operator platform over a mower deck, an engine, a transmission connected to the engine, and a generally horizontal shaft extending from the transmission, the generally horizontal shaft having a first end and a second end;

a rotary cutting blade under the mower deck and having a generally vertical shaft attached thereto, the generally vertical shaft having a first end and a second end; and a gear box having a top surface and a bottom surface, the gear box positioned between the mower deck and operator platform and enclosing the first end of the generally horizontal shaft and the first end of the generally vertical shaft, the generally vertical shaft extending through the bottom surface of the gear box, the gear box housing a pair of spiral bevel gears to change the transmitting direction from the generally horizontal shaft to the generally vertical shaft, the housing having a collar at the bottom surface for receiving and positioning a first roller bearing to rotatably support the generally vertical shaft extending through the opening between the first and second ends of the shaft, the housing having a cover with a collar for receiving and positioning a second roller bearing to rotatably support the first end of the generally vertical shaft and an internal recess dimensioned to provide adequate clearance space for the spiral bevel gear on the generally horizontal shaft and receiving the spiral bevel gear on the generally horizontal shaft; the measurement from the generally horizontal shaft to the bottom surface of the gear box being greater than the measurement from the generally horizontal shaft to the top surface of the gear box.

9. The apparatus of claim 8 further comprising a pulley connected to the generally vertical shaft, and a belt wound around the pulley to turn a plurality of rotary cutting blades.

10. The apparatus of claim 8 further comprising an operator seat mounted on the operator platform.

11. The apparatus of claim 8 wherein the top surface of the gear box comprises a cover attached thereto with threaded fasteners.

12. The apparatus of claim 8 wherein the pair of spiral bevel gears have different diameters.

13. The apparatus of claim 8 wherein the generally vertical shaft has a first section with a different diameter than the second section.

* * * * *